A. K. ALLISON.
SYSTEM AND APPARATUS FOR CONTROLLING MOTORS.
APPLICATION FILED OCT. 6, 1920.
1,398,056.
Patented Nov. 22, 1921.
2 SHEETS—SHEET 1.
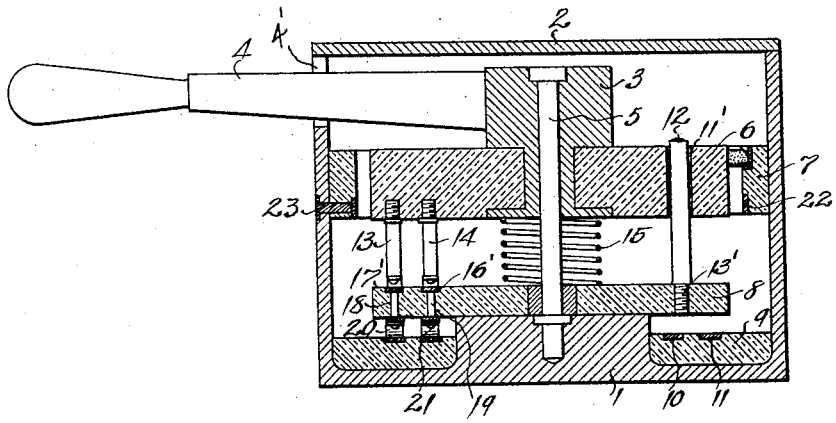
Fig.1.
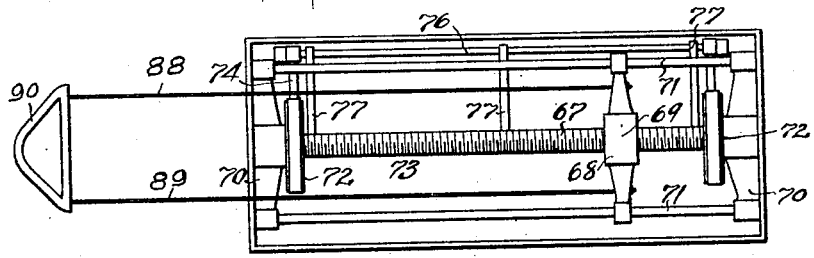
Fig.2.
Fig.3.
Fig.4.    Fig.5.
WITNESSES
Frederick Diehl
Robert I. Hulsizer
INVENTOR
A. K. Allison
BY
ATTORNEYS

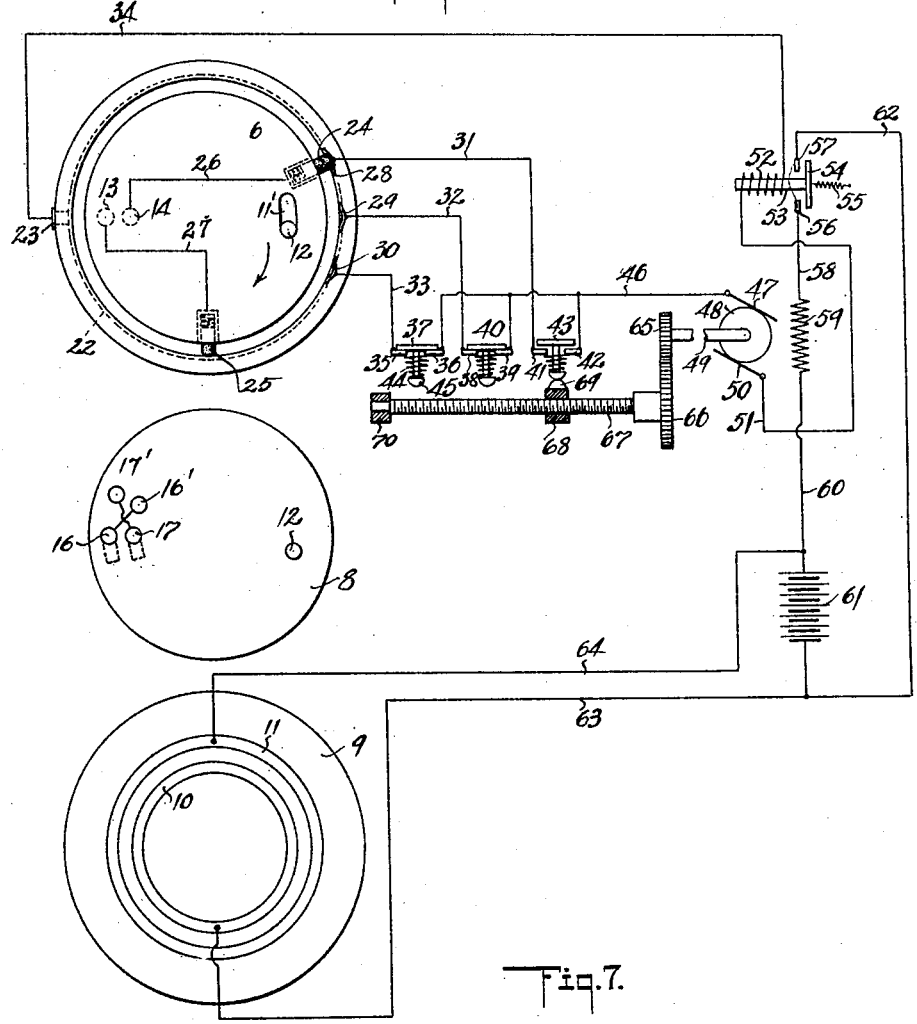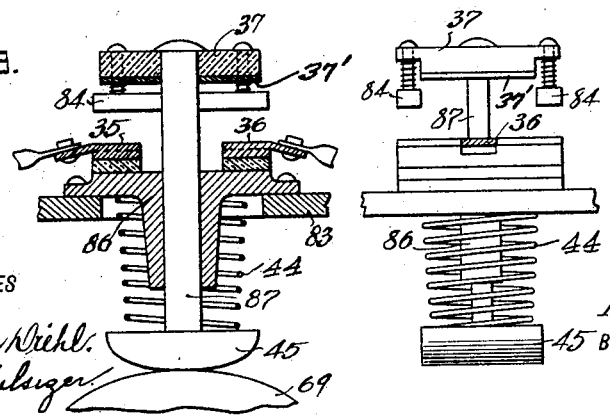

UNITED STATES PATENT OFFICE.

ALBERT K. ALLISON, OF TAPPAN, NEW YORK.

SYSTEM AND APPARATUS FOR CONTROLLING MOTORS.

1,398,056.  Specification of Letters Patent.  Patented Nov. 22, 1921.

Application filed October 6, 1920. Serial No. 415,055.

*To all whom it may concern:*

Be it known that I, ALBERT K. ALLISON, a citizen of the United States, and a resident of Tappan, in the county of Rockland and State of New York, have invented a new and Improved System and Apparatus for Controlling Motors, of which the following is a full, clear, and exact description.

This invention relates to a system and apparatus for controlling motors, and has for an object to provide a simple, compact apparatus and system involving in its arrangement a minimum number of parts and in its operation a minimum number of manipulations on the part of the person operating the system.

Another object resides in the provision of a particular system whereby the movements of the motor are definitely controlled, whether the motor is moving in one direction or another.

A further object resides in the provision of a controller which is a simple, compact unit and adapted by a minimum number of operations to control all movements of the motor and apparatus coöperating therewith.

A still further object resides in the provision of means whereby the movement of the motor is not only controlled in one direction or the other but is effectively braked at suitable intervals during its operation.

Another object resides in the particular arrangement and construction of parts which will be hereinafter described and claimed and are shown in the accompanying drawings.

The invention, in general, comprises a motor, which may be of any suitable type, in connection with which a source of power is associated. The control of the motor through this source of power is effected by the manipulation of a controller unit which may be associated near the motor or may be operated from a distance. This controller comprises a simple, compact unit involving few relatively movable parts operated manually by a handle. The movement of these parts controls the transmission of power through the system in one direction or another. When it is desired to have the motor moved in one direction, the handle is moved in the desired direction to a certain predetermined point in its travel, where the proper connections are made.

In order to reverse the motor, the handle is moved in the opposite direction. In connection with this reversal of movemenet of the controller, one of thet parts has a normally limited lag movement with respect to the other, so that whenever the handle is moved in a direction opposite to the direction of the last previous movement, the motor connections with the source of power are reversed before the main power circuit is connected up. This insures the positive and proper connection of the motor to the power circuit. It will be obvious from a consideration of the detail description to follow that the idea of this system can be embodied in more than one type of motor and more than one character of power without departing from the spirit of the invention.

A further provision resides in the arrangement of an effective mechanical brake operated during the movement of the motor in connection with means which interrupts the power circuit at the desired instant of time simultaneously with the operation of the brake, so that the application of power is interrupted at the same time that the braking means is applied. This insures the definite, positive stop of the motor at the desired point.

Furthermore, means are provided which may be electro-magnetic or of other form, whereby when the motor is not receiving power all of the circuits are open, whereby a misapplication of power is impossible.

The invention is shown in the drawings, of which—

Figure 1 is a vertical section taken through the controller unit;

Fig. 2 is a plan view of the operating parts associated with the motor itself, whereby the power circuit is interrupted and the braking means applied at desired intervals;

Fig. 3 is a vertical section of the apparatus shown in Fig. 2;

Fig. 4 is a section taken on the line 4—4 of Fig. 3;

Fig. 5 is a similar section taken on the line 5—5 of Fig. 3;

Fig. 6 is a diagrammatic representation of the power circuit of the system;

Fig. 7 is an enlarged detail of one of the power circuit interrupters; and

Fig. 8 is a sectional view of the same.

As shown in the drawings, the system involving the idea of my invention and its coöperating apparatus is shown as operating in conjunction with electricity as the source of power and with an electric motor as the operating motor. This is a preferred embodiment of my invention, although other sources of power may be used without departing from the spirit of the invention; for instance, it is possible to substitute a fluid system without materially changing the general idea of the invention.

The invention as shown in the drawings comprises a controller unit consisting of a casing 1 having a cover portion 2. Within the casing is a plug 3 to which a handle 4 is attached and is adapted to be manually operated with respect to the casing 1 through a slot 4' in the casing 1. This handle 4 and plug 3 are rotatably mounted on a shaft 5 suitably embedded in the bottom portion of the casing 1. A plate 6 of insulating material is connected to the plug 3 and is in the form of a circular plate around which and spaced therefrom is an annular ring plate 7 also of insulating material. This plate 7 is connected in any suitable manner to the casing 1. Within the casing 1 beneath the plate 6 is arranged a plate 8 of insulating material. This plate 8 is adapted to rotate around the shaft 5 and is insulatedly connected thereto. In the bottom of casing 1 an annular plate 9 of insulating material is positioned. This plate 9 on its upper surface is provided with conducting rings 10 and 11. The plate 8 is provided with an upwardly extending pin 12 the threaded end 13' of which is suitably connected to the plate 8. The upper end of the pin 12 is adapted to extend through a slot 11' in the plate 6, so that the plate 6 is permitted to have a certain amount of movement before the slot 11' and the pin 12 contact with each other. This permits a certain relative movement between the plate 6 and plate 8 in either direction before the plate 8 is actuated by the movement of the plate 6 through the pin 12, for reasons hereinafter to be set forth. At one point in the lower surface of plate 6, downwardly extending contact bars 13 and 14 are provided. Between the plate 6 and the plate 8 and around the shaft 5 is disposed a spring 15 tending to hold the plate 8 in its proper position below the plate 6. On the upper face of plate 8, and adapted to contact with the contacting bars 13 and 14, are a plurality of contact points 16 and 17 and 16' and 17'. These contact points are interconnected, as shown in Fig. 5, for the purpose of reversing the transmission of power, as will be hereinafter described. Between the contact points 16 and 17, connections 18 and 19 extend to contact springs 20 and 21 on the lower face of plate 8. These contact springs 20 and 21 are adapted, respectively, to rotate against the conducting rings 11 and 10 previously mentioned.

On the lower, inner face of the annular ring plate 7 is arranged a conducting ring 22 provided at one point with a terminal 23 connected with the outside of the casing 1. Suitably and resiliently positioned within the outer face of the plate 6 is a contact plug 24 of any suitable material. This contact plug 24 is adapted to bear against the inner surface of the annular ring plate 7. Similarly, another contact plug 25 is disposed in the outer face of the plate 6. The contact plug 25, however, is disposed at a lower level than the contact plug 24 in the outer face of the plate 6. Contact plug 25 in its movement is adapted resiliently to brush against the conducting ring 22. Within the plate 6 a conducting wire 26 is adapted to connect the contact plug 24 and the contact bar 14. Similarly, a wire 27 connects the contact plug 25 and the contact bar 13. Disposed at suitable intervals in the inner face of annular ring plate 7, and at an upper level thereof, are contact plates 28, 29 and 30. These are respectively connected by wires 31, 32 and 33 to certain circuit interrupters hereinafter to be described. A wire 34 is connected between the terminal 23 and an electro-magnetic switch, to be hereinafter described. The wire 33 connects with a contact 35 associated with a contact 36 across which a conducting plate 37 is adapted normally to rest. Similarly, the wire 32 connects to a contact 38 associated with a contact 39 and between which a contact plate 40 is adapted normally to rest. Wire 31 extends through a contact 41 associated with a contact 42 between which a conducting plate 43 is adapted normally to rest. Each of these contact plates 37, 40 and 43 are disposed to rest across their coöperating contact by means of a spring 44. Each of these contact plates are provided with a shaft having a cam head 45 on its lower end. The contacts 36, 39 and 42 are connected to a wire 46 leading to a terminal 47 of an electric motor 48 which is provided with a shaft 49. The other terminal 50 of the motor 48 is connected by a wire 51 to a magnetic coil 52 having a core 53 and an armature plate 54 normally retracted by a spring 55 from engaging with contacts 56 and 57. The opposite end of coil 52 is connected to the wire 34 previously mentioned. The contact 56 is connected to the field winding 59 of the motor, which in turn is connected by wire 60 to a battery 61. The contact 57 is connected by a wire 62 to the opposite side of the battery 61. The battery at one end is connected by a wire 63 to a conducting ring 10 of the controller unit. The other end of the battery is connected by a wire 64 to a conducting ring 11 of the controller unit.

The shaft 49 of the motor 48 is connected to a pinion 65 meshing with the gear 66. This gear 66 is adapted to operate a threaded shaft 67 upon which a traveler 68 is mounted. This traveler is provided on its upper surface with a cam head 69 adapted throughout its movement to contact with the cam heads 45 of the various interrupters above mentioned. The outer end of the threaded shaft 67 is suitably supported in a bracket frame 70.

As shown particularly in Figs. 2, 3, 4 and 5, the threaded shaft 67 is supported within a casing. The ends of the traveler 68 are slidably mounted with respect to bars 71. These bars 71 are suitably supported by the bracket frame 70 previously mentioned. At each end of the shaft 67 and movable therewith are disks 72 over which a brake band 73 is disposed. This brake band is adapted to be actuated by having one end thereof connected with a brake lever 74 normally held in an upward position by spring 75 beneath one end thereof. The brake lever 74 is connected to a brake shaft 76 which extends along one side of the casing. Throughout the length of the brake shaft 76 are disposed a plurality of brake cam bars 77 adapted to extend beneath a plate 80 which rests on these bars. This plate 80 is provided throughout its length with cam surfaces 79 suitably disposed and which are adapted to contact with the cam surfaces 78 on the lower face of the traveler 68. The end of the brake shaft 76 is suitably mounted in journals 81, as shown in Fig. 3.

This apparatus is disposed within the above mentioned casing, which is designated by the numeral 82 and which is provided with a cover 83. The traveler may be connected by links 88 and 89 with a suitable arm 90 to which any operable mechanism may be attached, such as a gear-shifting lever of a motorboat or other device.

In Figs. 7 and 8 a detail of the type of circuit interrupter used is shown. These interrupters are mounted on a cover 83 of the casing 82. Each interrupter comprises a pair of contact plates 84 which are preferably of carbon and are suitably connected with the carrier plate 37 of insulating material. The conducting plate 37' on the lower face of insulating plate 37 is adapted to close the circuit between the wires 35 and 36 when depressed. The carbon plates 84, when this interrupter is being opened, break the circuit with the wires 35 and 36 subsequent to the break between plate 37' and the wires 35 and 36. This subsequent break tends to prevent destructive sparking between the plate 37' and the wires or terminals 35 and 36.

A spring 44 is disposed between a lug 80 and the upper face of the cam surface 45. Through an opening in the cover 83 the lug 86 is adapted to project. This lug acts as a bearing for the shaft 87 to which the cam surface 45 is attached at its lower end and to which the conducting plate 37' is attached at its upper end. This lug 86 may be fastened to the cover in any suitable manner. In these figures the contacts 35 and 36 are shown immediately below the contacting bars 84 above mentioned. Normally the spring 44 holds the contact bars 84 firmly in relation with the contacts 35 and 36.

In the operation of the device, assuming the controller handle 4 has been moved to a position whereby contact plate 24 is closing the circuit through contact plate 28, the operation of the circuit is as follows: Current flows from the battery through wire 64 to conducting ring 11. The current flows from this ring through spring 20, connection 18, to contact point 16, through contact bar 13, wire 27, contact plug 25, conducting ring plate 22, terminal 23, wire 34, coil 52, to terminal 50 of the motor, through the motor to terminal 47, wire 46, through the contact 42, contact plate 43, contact 41, wire 31, contact plate 28, contact plug 24, wire 26, contact bar 14, contact point 17, connection 19, spring contact 21, conducting ring 10, wire 63, back to the opposite side of the battery. Since the coil 52 is energized through the above-mentioned circuit, the core 53 and the armature 54 are attracted to bridge the circuit across contacts 56 and 57, whereby the wires 62 and 60 of the battery 61 are connected with the field winding 59 of the motor, which then starts. Assuming the traveler 68 in the position between the intererupter 40 and the interrupter 43, the motor will tend to move to the right. This movement will continue until the cam head 69 contacts with the cam head 45 of the interrupter 43, which thereupon is lifted. This opens the motor circuit and stops the motor, at the same time it deënergizes coil 52 and causes the spring 55 to open the circuit through the field winding of the motor. At the same instant the cam surface 78 contacts with one of the cam surfaces 79 to depress the plate 80 and, through the bars 77, the shaft 76 and the brake lever 74, to apply the brake band 73 to the disks 72, so that the shaft 67 is stopped simultaneously with the deënergization of the motor.

Now, when it is desired to reverse the direction of the motor so as to cause the traveler 68 to move in the opposite direction, the handle 4 is moved in the opposite direction, for example, the direction indicated by the arrow in Fig. 6; therefore, it will be apparent from a consideration of the description previously mentioned that the plate 6 will move a certain distance without moving the plate 8, since the pin 12 will slide in the slot 11' until the upper end of the slot contacts with the pin. During this short interval of movement the contact bars 13 and 14 have been moved off contact points 16 and 17 into contact with points 16' and 17', whereby it is readily apparent that the battery connections are reversed with respect to the bars 13 and 14. This, therefore, reverses the application of the power potential to the motor circuit, so that the continued movement of the handle 4 into contact with the contact plate 29, for instance, will cause the motion of the motor in the opposite direction. This motion will continue until the cam surface 45 on the interrupter 40 is actuated by the cam head 69 of the traveler 68 and the motor circuit is opened in the manner above described.

It will be apparent, therefore, that I have provided a simple contact-controller unit whereby with a simple manual operation in one direction or another of a handle the various selective positions of the controller with respect to the power circuit are readily attained and the proper relative connection of the motor with the pressure in the power circuit is accurately and definitely determined regardless of the direction in which the handle is moved prior to the application of the power to the motor. Moreover, it is apparent that the apparatus intimately associated with the motor is simple and compact in form and very effective in its operation, the start and stop of the motor being definitely determined for each particular position and each period of motion thereof which may be desired. It will be apparent that except when the operation of the motor is desired, the power is not flowing in the circuit, therefore, this system results in a minimum consumption of power.

This system can readily be adapted for other fluid besides electricity by elimination of the field circuit and magnetic switch and the substitution of pipes, ports and valves for the wires, contacts and switches.

By having a mechanical brake operated by cam action during the movement of the motor, the brake is effective regardless of the motor speed. Moreover, electrical brakes are delicate and require attention and are liable to fail without warning.

What I claim is:

1. A control system for motors, comprising a source of energy, a motor, a controller, and means actuated by the movement of the controller in a predetermined direction from any point in its travel to reverse the connection of the motor with respect to the connections to the source of energy before the source of energy is connected to the motor.

2. A control system for motors, comprising a source of energy, a motor, a controller having a handle, and means actuated by the movement of the controller handle in a direction reverse to the last previous movement thereof at any point in its travel to reverse the connections of the motor with respect to the connections to the source of energy before the energy is applied to the motor.

3. A control system for motors, comprising a controller casing, a rotatable plate within said casing, a motor connection between said plate and said motor, a second rotatable plate within the casing, a source of energy, connections between the second plate and the source of energy, and means connecting the two plates to permit movement of the first plate to a limited extent and in a given direction prior to the movement of the second plate.

4. A control system for motors, comprising a controller casing, a rotatable plate within said casing, a motor connection between said plate and said motor, a second rotatable plate within the casing, a source of energy, connections between the second plate and the source of energy, means connecting the two plates to permit movement of the first plate to a limited extent and in a given direction prior to the movement of the second plate, and circuit connections between the plates for reversing the motor connections on the one plate with respect to the source of energy connections on the other during this relative movement of the two plates.

5. A motor controller comprising a casing, a plurality of rotatable plates within said casing, means for actuating said plates, circuit connections to each of said plates, contact means extending between the two plates and adapted to associate the above-mentioned connections, means for moving one plate relative to the other, and means coöperating with the contact means and circuit connections to reverse the relation of the circuit connections during this relative movement.

6. A circuit controller comprising a casing, a shaft within said casing, a handle, a rotatable plate rigidly connected to said handle and mounted on the shaft and having a slot therein, a rotatable plate loosely connected to said shaft, a pin on said second plate extending through said slot, contact points on one of said plates, and contact bars on the other of said plates, said plates adapted for limited movement relative to each other, said contact bars and points adapted during said limited movement to effect a reversal of the relation therebetween.

7. A controlling device for motors, comprising a threaded shaft actuated by said motor, a circuit associated with said motor, a source of energy for said circuit, a plurality of switches in said circuit, a carrier mounted on said shaft and moved thereby, a brake associated with said shaft, a plurality of levers coöperating with said brake, and means on said carrier selectively adapted through its movement to actuate a switch and one of said brake levers whereby the motor circuit is opened and the brake is applied to the shaft substantially simultaneously.

8. A motor control device comprising a controller, circuit connections between the controller and motor, a source of energy, circuit connections between the source of energy and the controller, a plurality of independent selectively actuated switches in the motor circuit between said motor and the controller, an electromagnetic device in series with the motor, a motor field-winding circuit controlled by said electromagnetic device, means on said controller for selectively applying energy to the motor through one of said switches, and means controlled by the movement of the motor to open said switch after a predetermined travel.

9. A motor controlled device comprising a source of energy, a controller, connections between the controller and the source of energy, a circuit from said controller to one side of the motor, said circuit including an electromagnetic device, a motor field-winding circuit controlled by said electromagnetic device, a plurality of circuits from the other side of the motor to the controller, a switch in each of said circuits, means actuated by the movement of the motor to operate said switches, and means actuated by the movement of the controller to reverse the connections between the source of energy and the motor when the direction of the motor is to be reversed and prior to the application of the energy to the motor.

ALBERT K. ALLISON.